Figure 5:
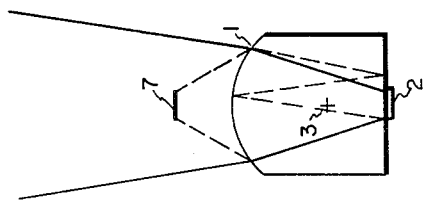

Dec. 15, 1964     M. M. MERLEN     3,161,772

HYPERIMMERSED BOLOMETER SYSTEM

Filed Feb. 8, 1962

INVENTOR.
MONTY M. MERLEN

BY

*ATTORNEY*

United States Patent Office 3,161,772
Patented Dec. 15, 1964

3,161,772
HYPERIMMERSED BOLOMETER SYSTEM
Monty M. Merlen, Stamford, Conn., assignor to Barnes Engineering Company, Stamford, Conn., a corporation of Delaware
Filed Feb. 8, 1962, Ser. No. 171,966
4 Claims. (Cl. 250—83.3)

This invention relates to an improved optical system using hyperimmersed thermistor bolometers or other radiation detectors such as photon actuated detectors.

In recent years immersed bolometers, that is to say bolometers in which the radiation detector, such as a thermistor flake, is in contact with the base of the lens without intervening air spaces have achieved very extensive use because of the great increase in responsivity which is made possible by immersion. These bolometers form the subject matter of the patent to Wormser No. 2,983,888, May 9, 1961. In connection with a particular kind of thermistor the immersed bolometers are also described and claimed in the patent to DeWaard No. 2,994,053, July 25, 1961. Hyperimmersed bolometers, that is to say bolometers in which the lens is formed of a spherical portion and an extension, usually cylindrical, so that the radiation detector is immersed on the back of the lens at a point beyond the center of curvature of its front surface, have also been extensively used. Under special circumstances such bolometers permit increases in responsivity up to 10 times or more. It is with an improved form of these hyperimmersed bolometers that the present invention deals.

For many purposes the ordinary hyperimmersed bolometers operate with perfect satisfaction. In some special circumstances and special instrument types however, difficulties have arisen. For example in a hyperimmersed bolometer in which it is desired that the radiation detector have a comparatively narrow cone of acceptance, problems have arisen when a very intense source of radiation is located somewhat beyond the cone of acceptance intended for the detector. Such instances may arise in instruments such as horizon sensors, trackers and the like where a very intense radiator such as the sun may sometimes be found just beyond the normal cone of acceptance of the radiation detector. In such cases spurious signals have been noted and for a time it was thought that this constituted a limitation on the field of usefulness of hyperimmersed bolometers. This problem is solved by the present invention as will be described below.

Before describing the invention in more detail it should be pointed out that while at present one of the most important uses of the present invention involves bolometers with infrared sensitive detectors and lenses which pass only infrared such as, for example germanium lenses, the invention is in fact a purely optical invention. The nature of the radiation detector has nothing to do with the invention and it is equally applicable to hyperimmersed detector system where the radiation detector and the lenses are suitable for response to radiations of different wavelengths such as visible light or even ultraviolet. As it will appear below, the present invention solves the problems of the hyperimmersed bolometers or radiation detectors by the addition of an element at a certain positional relation to the immersed bolometer. The invention is really an optical system in which the hyperimmersed detector is only one element entering into the combination.

The invention will be described in greater detail in connection with the drawings which illustrate an analysis of the causes of the problem as well as its solution. The specific description will be in connection with a bolometer using a thermistor as radiation detector but this is only illustrative and any other radiation detectors may be used suitable for the particular radiation desired. The advantage of hyperimmersed bolometers with temperature sensitive detectors such as thermistors is somewhat greater as in such cases it is possible to eliminate an element namely the heat sink which is required when chopped radiation is used as is normally the case or where fast response is otherwise needed. Thus with hyperimmersed thermistor bolometers there is the additional function of eliminating a separate heat sink as the lens itself performs this function. In referring to thermistors the term is used broadly to cover elements which have a high negative or positive coefficient of electrical resistance with temperature. It is not used in a narrow or restricted sense as related to certain oxide thermistors which are mixtures of manganese, nickel or cobalt oxides. While this specific type of thermistor can be used and is one of the common thermistors the present invention is applicable to any of them and includes among other negative temperature coefficient thermistors the germanium and silicon thermistors of the DeWaard patent and others. The invention, therefore, as has been mentioned above relates to an optical system and is not concerned or limited to any particular radiation detector.

In the drawings FIGS. 1 to 4 show step wise the reason for spurious signals and FIG. 5 shows the solution of the problem with which the present invention deals.

In all of the figures the hyperimmersion lens is designated as 1. The radiation detector, such as a thermistor, is shown at 2 immersed on the base of the hyperimmersion lens. It should be noted that in the case of lenses of conductive material, such a germanium, the radiation detector has to be insulated which is effected normally with an extremely thin film of selenium or other material. This is conventional in thermistor bolometers and so for clarity the thin insulating layer is not shown in the drawings and, of course, is not needed when the lens is made of other material such as fused aluminum oxide. In each lens the center of curvature of the front surface is shown at 3.

Figure 1:
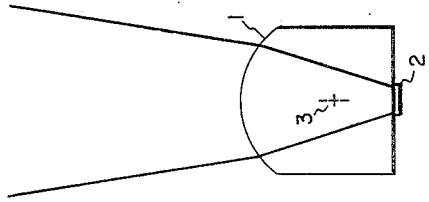

FIG. 1 shows the rays for a bolometer of narrow acceptance angle. The desired acceptance cone is bounded by the solid rays. This is the optical configuration which the bolometer is supposed to have and which, until the problems arose with strong radiators such as the sun, was believed to be the only way the bolometer functions.

Figure 2:
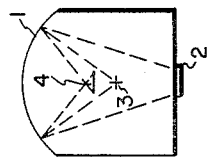

Since the lens, in which the thermistor flake or other radiation detector is immersed, has a refractive index differing from its surroundings a small amount of reflection takes place at the lens surface. The same is true with multiple reflection. The total amount of reflection is very small but it is not zero and may amount to as much as 1 or 2% or somewhat more. FIG. 2 illustrates the ray paths of such a reflection in dashed lines. It will be seen that the rays are reflected from the front surface of the hyperimmersion lens. This front surface reflects a portion of the light since there is a difference in refractive index between the lens and the air or other medium and some reflection takes place. Even when an antireflection coating is used on the front surface of the lens, as is common, this only reduces the reflection over the band of wavelengths for which the antireflection coating is effective. It will be seen from FIG. 2 that the reflection forms a real image in the lens of the detector, the image, of course, being on the other side of the center of curvature of the lens surface. In the case illustrated the image will be somewhat smaller than the thermistor.

Figure 4:
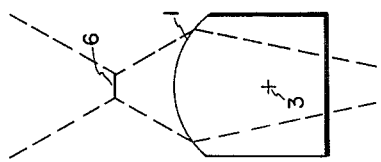
Figure 3:
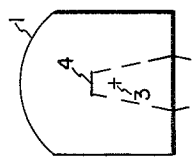

It is common in developing optical paths to make use of the convention of virtual images, even though these are optical abstractions, as they make an understanding of the optical paths more simple. This convention will be used in the present specification and when used shows in FIG. 3 that the real image 4 corresponds to a virtual image 5 outside of the lens. FIG. 4 shows the rays from this virtual image passing through the lens. It will be noted that they form another real image 6 in front of the lens and the rays continue on in the form of a conical beam of greater divergence than the original acceptance angle of the thermistor in FIG. 1. Of course, light sources located in this cone will project their light rays backward and these will eventually strike the detector. One simple way of visualizing this phenomenon, the existence of which was not known prior to my invention, is to think of the normal acceptance angle of the detector as a bright cone of light surrounded by a larger cone which looks like a dim halo. Even though this system may transmit less than a percent or even a fairly small fraction of a percent of light from this wider cone interference can result when a radiator in the cone is very much more intense than the desired target within the acceptance angle of the thermistor. As has been pointed out above this can occur in instruments when the sun enters the outer cone.

Theoretically the radiation from the surrounding cone striking the detector is also reflected and the same ray tracing would show that this produces another real image within the lens close to the real image of the first reflection and correspondingly an image outside the lens also near to the first image. In other words theoretically there should be an infinite succession of images. As a practical matter, however, the reflection is so small, which is why this phenomenon was not discovered until the present invention, that radiation from second and further order reflections is negligible. Even with an extremely intense radiator anything beyond the second order is normally below measurement level.

FIG. 5 shows the present invention. Here the normal acceptance angle of the thermistor is shown in solid lines and the light path from the first reflection in dashed lines. According to the present invention an opaque baffle 7 is introduced in or closely adjacent to the plane of the real image 6 in front of the lens. This completely blocks any radiation from the outer cone and even if we are concerned with blocking radiations from the second order of reflections this is easily effected by making the light baffle very slightly larger for the successive cones come to images of nearly the same size close to the same plane and so a baffle only a few percent larger than theoretically necessary for the first order reflection will also stop second order reflection. Preferably this modification is used as it also guards against slight displacement or warping in use. Of course, if the baffle is slightly smaller than the first order of reflection cone it will still eliminate so much of the radiation that for many purposes the result is practically the same as with a baffle of sufficient size to completely eliminate all radiation. However, as pointed out above it is such a simple matter to have the baffle slightly oversized that this is normally preferred.

Most optical inventions perform a desired result but only at a price and this invention is no different. The price is the slight decrease in light in the desired detector acceptance cone caused by the baffle. This is a very small price to pay because the percentage of obscuration is extremely small, in many instruments 5% or less.

In general the present invention is not concerned with the dimensions of the hyperimmersion lens. The degree of hyperimmersion, that is the relative distance beyond the center of curvature of the lens face at which the thermistor is located, is determined by considerations of thermistor sizes, the nature of collecting optics, where they are used, and other factors in the final optical instrument in which the hyperimmersed bolometer is used. As is common in these instruments the degree of hyperimmersion is dictated by what is needed although there are some practical limits beyond which other optical problems make further degrees of hyperimmersion undesirable. With germanium lenses practical operating bolometers with increases in detector responsivity of 10 to 1 have been achieved and so it can be realized that the very slight loss of light involved by the present invention, which is only a few percent, is insignificant compared to the great increases in responsivity made possible by hyperimmersion.

The invention has been described in connection with ordinary hyperimmersed bolometers in which the reflection from the rear surface of the lens is comparatively small. The invention is also useful with the modified bolometers described and claimed in the application of DeWaard, Fisher and Hvizdak, Serial No. 141,469, filed September 28, 1961, now Patent No. 3,109,097, in which the portions of the rear face of the lens not occupied by the detector are provided with good reflecting surfaces. In such a case the intensity of radiation from sources in the outer cone is markedly greater and the benefits of the present invention are even more significant.

I claim:

1. In a hyperimmersion radiation detector optical system in which the radiation detector is optically immersed on the base of a lens at a point beyond the center of curvature of the lens face and the acceptance angle for radiation of the detector is thereby determined, the improvement which comprises
    (a) a substantially radiation opaque light baffle in front of the lens located in proximity to the plane in which a real image formed by radiation reflected from the detector and the curved and other surfaces of the lens is formed,
    (b) the extent of the radiation opaque baffle being at least approximately as large as the real image, whereby radiation passing through the real image is substantially blocked from reaching the radiation detector.

2. An optical system according to claim 1 in which the radiation opaque baffle is slightly larger than the real image of the reflected rays and sufficiently large to block a substantial portion of radiation passing through a second order real image produced by reflection of radiation from the radiation detector.

3. An optical system according to claim 1 in which the radiation detector is a thermally responsive detector and the lens is a material of high heat conductivity whereby it performs the dual function of hyperimmersion lens and heat sink for the detector.

4. An optical system according to claim 3 in which the lens is of germanium.

References Cited in the file of this patent

UNITED STATES PATENTS

| | | |
|---|---|---|
| 2,735,331 | McMaster et al. | Feb. 21, 1956 |
| 2,889,737 | Griss et al. | June 9, 1959 |
| 2,983,823 | Oberly | May 9, 1961 |
| 2,994,053 | DeWaard | July 25, 1961 |